United States Patent
Younkin

[11] 3,739,382
[45] June 12, 1973

[54] AIRCRAFT LATERAL GUIDANCE SYSTEM
[75] Inventor: James R. Younkin, Mineral Wells, Tex.
[73] Assignee: Mitchell Industries, Inc., Mineral Wells, Palo Pinto County, Tex.
[22] Filed: Sept. 8, 1970
[21] Appl. No.: 70,250

[52] U.S. Cl.............................. 343/107, 244/77 A
[51] Int. Cl............................................... G01s 1/16
[58] Field of Search...................... 343/108 R, 107; 244/77 A, 77 S

[56] References Cited
UNITED STATES PATENTS
3,041,607  6/1962  Rhodes et al...................... 343/107
3,098,228  7/1963  Medlinski et al.............. 244/77 S X

*Primary Examiner*—Benjamin A. Borchelt
*Assistant Examiner*—Richard E. Berger
*Attorney*—Richards, Harris & Hubbard

[57] ABSTRACT

Course and directional radio signals are combined to produce an aircraft guidance signal. The guidance signal is amplified and applied to control the intercept of the aircraft with a directional radio beam. Circuitry is provided which is responsive to the radio signal for decreasing the aircraft angle of intercept to a preset minimum intercept angle as the aircraft approaches the radio beam. Upon intercept with the radio beam, the minimum intercept angle is reduced and the aircraft is directed along the radio beam. Also upon intercept with the radio beam, a cross wind correction is applied to the guidance signal. After a first preselected time interval from the intercept with the radio beam, the gain of the guidance signal is substantially reduced to provide a more comfortable flight. After a second predetermined time interval from intercept with the radio beam, the permissible bank angle of the aircraft is limited. A novel nonlinear circuit is provided in a feedback circuit to nonlinearly control the roll motor of the aircraft.

19 Claims, 4 Drawing Figures

Patented June 12, 1973

INVENTOR:
JAMES R. YOUNKIN

Richards, Harris & Hubbard
ATTORNEYS

AIRCRAFT LATERAL GUIDANCE SYSTEM

FIELD OF THE INVENTION

This invention relates to aircraft guidance, and more particularly to a method and apparatus for providing automatic lateral guidance for an aircraft with respect to a directional radio beam.

THE PRIOR ART

A number of different types of systems have been heretofore developed for controlling the lateral guidance of an aircraft as it approaches a directional radio beam. In many of these systems, course and radio signals have been mixed and utilized as guidance signals as the aircraft is guided into intercept with a directional radio beam. Examples of such systems are U.S. Pat. No. 2,993,664 issued to Alderson on July 25, 1961 and U.S. Pat. No. 2,993,665 issued to Carpenter on July 25, 1961.

Other types of aircraft control systems have been developed wherein a feedback loop system is utilized for aircraft guidance control. In many of these systems, a plurality of series connected diodes have been utilized as nonlinear elements in order to provide a nonlinear action to the aircraft roll control motor. Such previous nonlinear diode circuits have the disadvantage that they cannot easily be tailored or adjusted for use with aircrafts with different operating capabilities or with aircraft roll control motors which have various threshold operating characteristics. Examples of prior systems with nonlinear diode circuits are disclosed in the U.S. Pat. No. 3,555,391, by James R. Younkin, filed Mar. 11, 1966, and assigned to the present assignee.

SUMMARY OF THE INVENTION

In accordance with the present invention, radio and course signals are combined and amplified for use in directing an aircraft toward a directional radio beam at a selected intercept angle. Circuitry is provided for introducing cross wind correction to the aircraft in response to intercept with the center line of the radio beam. Circuitry is also provided for reducing the gain of the amplification of the radio and course signals after a first preselected time interval from intercept with the radio beam. Circuitry is provided to limit the permissible bank angle of the aircraft after a second preselected time interval from the intercept with the radio beam.

In accordance with another aspect of the invention, a combined directional radio and course signal is amplified and utilized to control the guidance of an aircraft toward an intercept with a directional radio beam and a predetermined intercept angle. Circuitry is responsive to the radio signals for decreasing the angle of intercept to a preselected minimum intercept angle as the aircraft approaches the radio beam. Circuitry is responsive to intercept with the radio beam for reducing the minimum intercept angle and for directing the aircraft along the radio beam.

In accordance with another aspect of the invention, a nonlinear circuit is provided for use in a feedback circuit for control of the roll motor of an aircraft which includes first and second transistors having like electrodes connected. A bias voltage is applied across the device, with circuitry provided to supply a varying signal input to the like electrodes of the transistors. Each of the transistors is operable to become conductive in response to a signal input of a different polarity. Output terminals are provided across the transistor whereby a nonlinear output signal is produced in dependence upon the relative magnitudes of the voltage bias and the signal input.

In accordance with a more specific aspect of the invention, a nonlinear circuit is provided including first and second transistors of opposite conductivity type having the emitters thereof commonly connected in a complementary configuration. Structure is provided to supply a preselected bias voltage to the bases of the transistors. Structure is provided to supply an input signal to the commonly connected emitters of the transistors. Output terminals are connected to the collectors of the transistors to receive nonlinear output signals.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
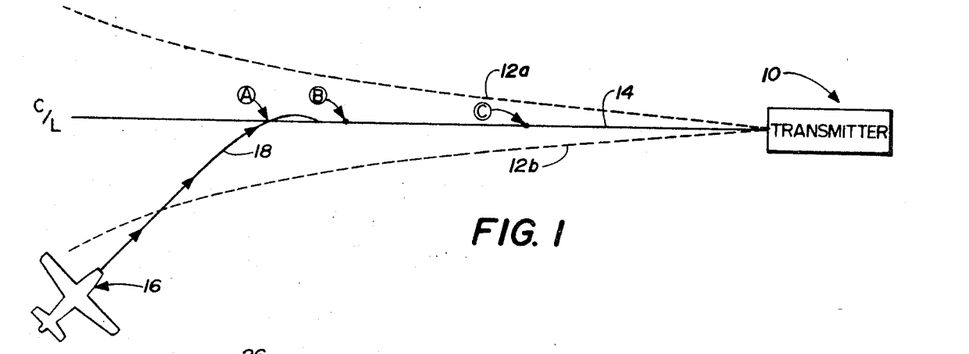
FIG. 1 is a diagrammatic illustration of the approach and intercept of an aircraft according to the present invention.

Referring to FIG. 1, a transmitter 10 transmits a directional radio signal identified by the dotted lines 12a–b. The center line of the directional radio beam is identified by the line 14. The transmitter 10 may comprise either a conventional omni or localizer transmitting station which operates in the well-known manner.

It is the object of the invention to guide the aircraft identified generally by the numeral 16 to a preselected intercept with the center line 14, and then to perform selected automatic operations on the guidance of the aircraft as the aircraft approaches the transmitter station 10. In the operation of the system, the aircraft 16 travels the path 18 which is initially about 45° to the center line 14. This intercept angle is gradually reduced to about 22° just before intercept is made with the center line 14 at point A. The aircraft is then directed along the line 14 toward the transmitter 10.

At the intercept at point A, cross wind correction is applied to the guidance of the aircraft in order to compensate for cross winds. After intercept, the aircraft continues along the center line 14 toward the transmitter 10 until point B, which is reached after a preselected first time interval after intercept. At point B, which generally occurs after from 10–20 seconds after intercept, the gain of the guidance signal applied to the aircraft 16 is reduced in half. This is done to soften the effect of the guidance control of the aircraft to provide a more comfortable ride after the aircraft is on course. When the aircraft reaches point C, which occurs at a second preselected time interval after intercept, the permissible bank angle of the aircraft is limited. In the preferred embodiment, ninety seconds after intercept, the bank limits of the aircraft are reduced from approximately 20° to approximately 7°, in order to eliminate wild banking excursions of the aircraft when the aircraft flies over the transmitter 10. It will be understood that the time intervals and control functions described may be varied to accommodate various operating characteristics of different aircraft.

Figure 2:
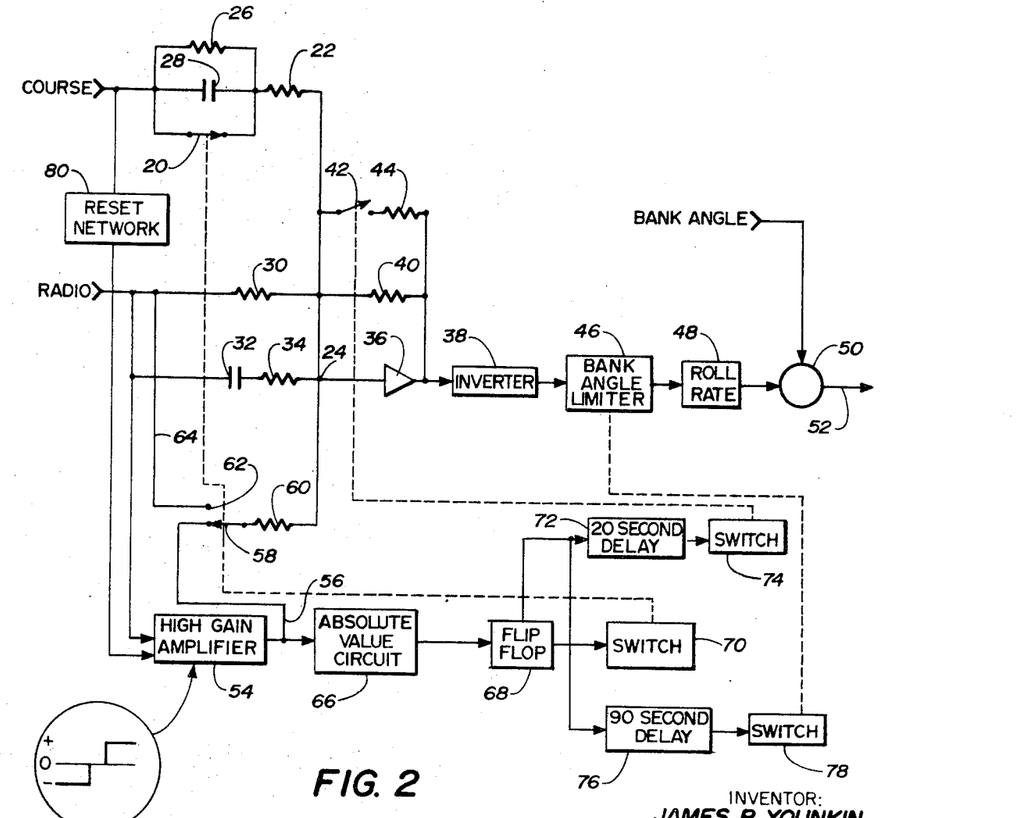
FIG. 2 is a combined schematic and block diagram of the basic lateral guidance system of the invention.

FIG. 2 illustrates a combination schematic and block diagram of the present lateral guidance control system for an aircraft for operation in the radio mode. Circuitry for operation in a heading mode (without radio) and in a reverse mode for flying the back course of a localizer radio beam) will be described in detail with respect to FIGS. 3 and 4. In operation in the radio mode, course information is fed through a normally closed switch arm 20 and through a resistor 22 to a summing point 24. The course signal may be derived from a conventional omni course pickup and is representative of craft displacement from a selected ground track. A high pass filter comprising a resistor 26 and a parallel connected capacitor 28 is connected across the switch 20 for insertion into the course input when the switch 20 is opened. A radio signal representative of the deviation of the aircraft from the selected radio beam is fed via a resistor 30 and via a series connected capacitor 32 and resistor 34 to the summing point 24. The combined course and radio signals are fed to an operational amplifier 36, the output of which is fed to an inverter circuit 38. A resistor 40 is normally connected across the operational amplifier 36. A switch 42 and a resistor 44 are also connected across the operational amplifier 36. Upon closure of the normally open switch 42, the resistor 44 is thrown across the amplifier 36 in order to reduce the gain thereof.

The output of the inverter circuit 38 is fed through a bank angle limiter circuit 46 which is normally set to provide a preselected bank angle control to the aircraft. Normally, this permissible bank angle is 20°. Limiter 46 is also operable to further limit the bank angle to a lower value such as approximately 7°. The output guidance signal from the limiter 46 is fed through a roll rate circuit 48 and then to a summing circuit 50. A bank angle signal is combined at the summing circuit 50 to provide an output via lead 52 which controls the roll motor of the aircraft. The roll motor controls the ailerons of the aircraft in the well-known manner in order to control the lateral guidance of the aircraft.

The radio signal is also fed to a high gain amplifier 54. When the aircraft is within range of the radio beam, the radio signal fed to amplifier 54 is high enough to saturate the amplifier. As shown in the illustrated waveform in FIG. 2, a deadzone is provided in the output characteristics of the amplifier 54 to enable intercept with the radio beam while flying closely parallel to the beam. The output from the amplifier 54 is fed via a lead 56 to a switch arm 58. Normally, switch arm 58 is connected to a terminal of a resistor 60, the other terminal of which is connected to the summing point 24. When the switch arm 58 is connected to the output of amplifier 54, a false radio signal is applied to the summing point 24 from amplifier 54 in order to introduce a preselected minimum intercept angle into the guidance signal for the aircraft. In the preferred embodiment, this false radio signal is representative of an intercept angle of approximately 22½°. Switch arm 58 may be switched into contact with a terminal 62 which is connected to a lead 64 in order to remove the effect of the high gain amplifier 54 from the circuit.

The output of amplifier 54 is also fed through an absolute value circuit 66, the output of which is applied to a flip-flop circuit 68. The flip-flop circuit 68 is operated when the amplifier 54 senses the intercept of the aircraft with the center line of the directional radio beam. The output of flip-flop 68 is applied to a switch 70 which control the position of the switch arm 58 and switch arm 20. Additionally, the output of the flip-flop 68 is applied to a twenty second delay circuit 72 which operates a switch 74. Switch 74 controls the operation of the normally open switch 42. The output of the flip-flop 68 is further applied to a ninety second delay circuit 76 which controls a switch 78. Switch 78 controls the operation of the bank angle limiter between the two prescribed bank limits. A reset network 80 is connected between the course input and the amplifier 54, and is responsive to large increases in rate and amplitude in order to cause resetting of some of the control features of the system.

The basic operation of the invention in the radio mode will be understood by reference to FIGS. 1 and 2. When the aircraft 16 approaches within range of the directional radio beam emitted from the transmitter 10, the radio and course signals are summed at point 24 in order to provide an initial guidance signal for directing the aircraft 16 at an intercept angle of approximately 25°. Additionally, the detection of the radio beam by the high gain amplifier 54 causes the amplifier 54 to become saturated, therefore introducing a false radio signal into the summing point 24 to provide an additional intercept angle of approximately 22½° to the aircraft. Thus, upon initial detection of the directional radio beam, aircraft 16 is directed at an approximate 45° intercept angle with the center line 14 of the radio beam. As the aircraft 16 approaches the center line 14 of the radio beam, the radio error signal is reduced, thereby reducing the intercept angle of the aircraft. Just before the aircraft reaches the center line of the radio beam, the aircraft bank intercept angle will have been reduced to approximately the 22½° provided by the high gain amplifier 54.

When the aircraft reaches close proximity with the radio beam or intercepts center line 14 of the radio beam, the high gain amplifier 54 senses the intercept and will, after a deadzone, generate a saturated output signal of opposite polarity. This change in polarity is sensed by the absolute value circuit 66 which causes the flip-flop 68 to change state. Transition of the flip-flop 68 actuates the switch 70 which then switches the switch arm 58 into contact with the terminal 62. Switch 70 also opens the switch arm 20 at this time. Thus, the high gain amplifier 54 is essentially removed from the circuit to thereby remove the false radio indication which provided the artificial 22½° intercept angle to the aircraft. The opening of the switch arm 20 introduces the high pass filter comprising the resistor 26 and the capacitor 28 into the course signal, thereby providing a small steady state heading signal to compensate for cross wind deviation of the aircraft.

The output from the flip-flop 68 is provided with a twenty second delay by the circuit 72, after which the switch 74 is operated to close the switch arm 42. Closing of the switch arm 42 introduces the resistor 44 across the amplifier 36, thereby reducing the gain of the amplifier 36 by one-half. This reduction in gain of amplifier 36 provides a more comfortable ride after the tight guidance required by intercept requirements has been met.

The actuation of the flip-flop 68 is also sensed and delayed for ninety seconds by the delay circuit 76, after which the switch 78 is operated to switch the bank angle limiter 46 from approximately a 20° bank angle limit to approximately a 7° bank angle limit. This limitation in bank angle is provided to prevent wild excursions of the aircraft as the aircraft flies over the transmitter 10.

The high gain for the system provided when the switch arm 42 is in its normal position may be obtained after intercept by resetting the circuit. This may be done by changing from radio to heading mode and then back to radio mode. Manually changing the course also resets the switch 74 in order to open switch arm 42.

Figure 3:
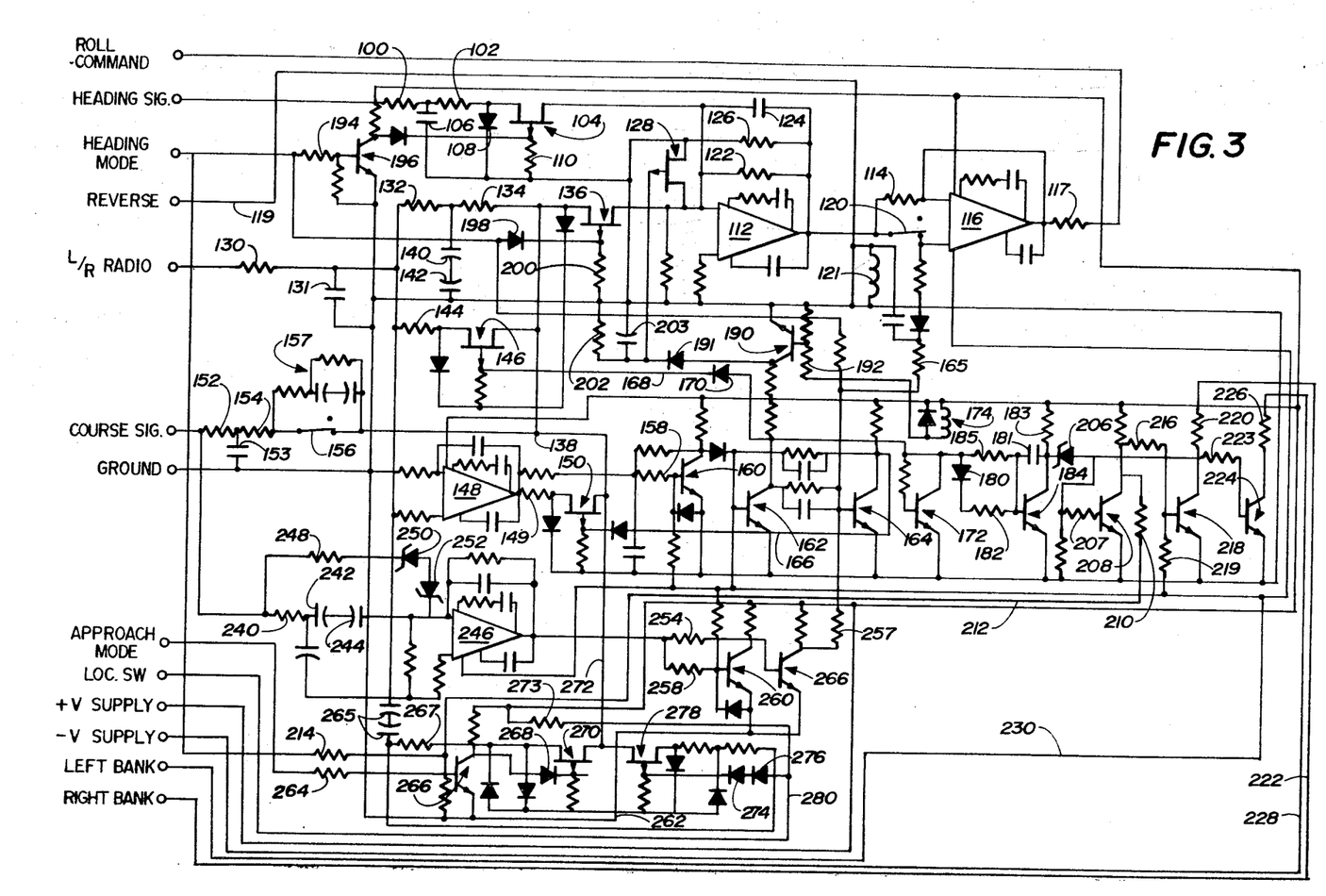
FIG. 3 is a schematic diagram of a portion of the system shown in FIG. 2.
Figure 4:
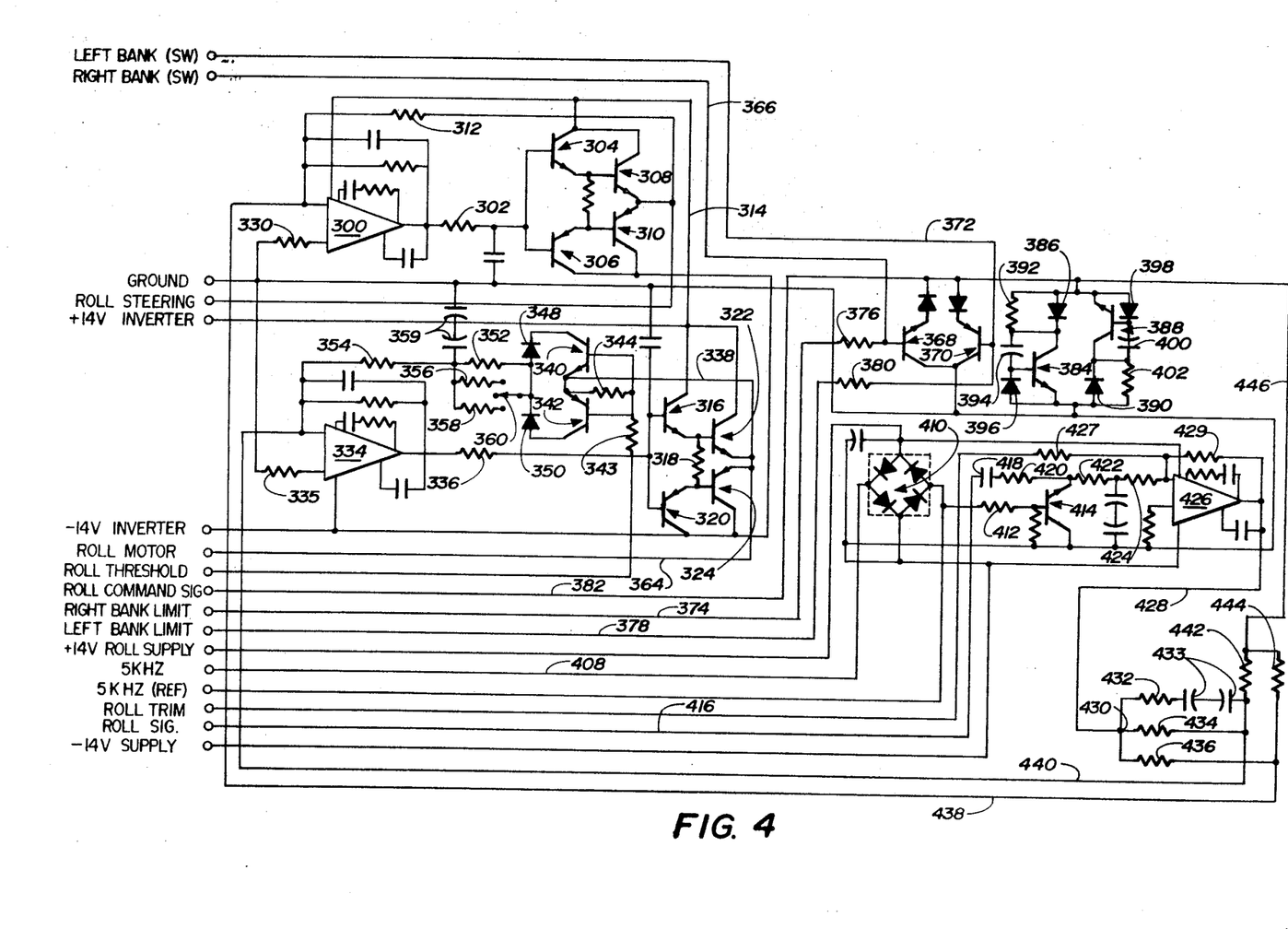
FIG. 4 is a schematic diagram of the remainder of the system shown in FIG. 2.

Referring to FIGS. 3 and 4, the circuitry is shown in schematic detail and includes circuitry for operation in heading, radio or reverse modes. For operation in the heading mode, heading signals are fed via a resistor 100 and 102 through a field effect transistor 104. A capacitor 106 is connected in parallel with a diode 108 across the transistor 104 and a resistor 110. The heading signals are fed to the input of an amplifier 112 whose output is fed via a resistor 114 to the input of a unity gain amplifier 116. Amplifiers 112 and 116 may comprise any suitable integrated circuit amplifier, such as the circuits manufactured and sold by Motorola Inc. The output from amplifier 116 is fed via a resistor 117 to act as a roll command signal for portions of the circuitry shown in FIG. 4. A relay arm 120 is operable between two positions by a solenoid coil 121 to selectively provide an inverted or noninverted output for the signals fed into the amplifier 116. A reverse signal may be applied to coil 121 via lead 119.

A resistor 122 is connected in parallel with a capacitor 124 across the amplifier 112. A resistor 126 is connected in series with a field effect transistor 128 also across the amplifier 112. Transistor 128 acts as a switch to selectively control the gain of amplifier 112 by selective insertion of resistor 126 in parallel with the amplifier 112.

For operation of the system in the radio mode, a left/right radio signal representative of the deviation of the aircraft from the selected directional radio beam is fed via a resistor 130 and capacitor 131 through resistors 132 and 134 to a terminal of a field effect transistor switch 136. The radio signals may be fed through transistor 136 to an input of amplifier 112. The radio signals are also fed to a summing point 138 for combination with course signals. The guidance signal amplified by amplifier 112 is fed to the unity gain amplifier 116 for production of a roll command signal. Capacitors 140 and 142 are connected between the resistors 132 and 134 to ground.

The radio signal is also fed via a resistor 144 to a field effect transistor 146. The radio signal is also fed to the input of an operational amplifier 148. The output of the amplifier 148 is fed through a resistor 149 to a field effect transistor 150, one terminal of which is connected to the summing point 138 to receive a course signal fed via resistors 152 and 154 through a switch arm 156. a high pass network 157 is connected across switch arm 157. The output of the amplifier 148 is also fed through a resistor 158 to the base of a transistor 162 and from thence to a transistor 164. The output from the transistor 162 is also fed via resistor 165 to control the energization of the solenoid coil 121. The collector of transistor 164 is connected by a lead 166 to the terminal of the field effect transistor 154. Transistors 162 and 164 and their associated circuitry form a conventional flip-flop.

The gate of the field effect transistor 146 is connected via a lead 168 through a diode 170 and a resistor 171 to the base of a transistor 172. A collector of the transistor 172 controls the energization of a solenoid coil 174. Energization of the solenoid coil 174 controls the operation of the switch arm 156.

The collector of the transistor 162 is also fed via a diode 180 and a resistor 182 to the base of a transistor 184. A capacitor 181 is connected between the base and collector of transistor 184. A resistor 183 is connected to the collector of transistor 184. A resistor 185 is connected across diode 180 and resistor 182. The collector of the transistor 162 is further connected via resistors 186 and 188 to a transistor 190. The collector of transistor 190 is connected through a diode 191 to the gate of transistor 128. The base of transistor 190 is connected via a resistor 192 to one terminal of the solenoid coil 174 for control thereof. A heading mode signal is fed via resistor 194 to the base of a transistor 196. The collector of the transistor 196 is fed to a terminal of the field effect transistor 104. The heading mode signal is also fed through a diode 198 to a terminal of the field effect transistor 136 for control thereof. The heading mode signal is further fed through resistors 200 and 202 to the transmitter 190. A capacitor 203 is tied to the cathode of diode 191 and to a terminal of transistor switch 128.

The collector of the transistor 162 is connected through a Zener diode 206 and resistor 207 to the base of a transistor 208. The collector of transistor 208 is connected through a resistor 210 and a lead 212 to receive a heading mode signal through a resistor 214. The collector of the transistor 208 is also fed through a resistor 216 to the base of a transistor 218. The base of transistor 218 is connected to resistor 219. The output from transistor 218 is applied through a resistor 220 to a lead 222 to the right bank switching terminal. The base of transistor 208 is coupled through a resistor 223 to the base of a transistor 224, the collector of which is connected through a resistor 226 and via a lead 228 to the left bank switching terminal. Positive voltage bias supply is fed to the circuit via the lead 230 from a suitable source.

The course signal applied to the circuit is also fed through a resistor 240 and through back-to-back capacitors 242 and 244 to the input of an operational amplifier 246. The heading signal is also applied via a resistor 248 and through back-to-back Zener diodes 250 and 252 to the input of the amplifier 246. The output from the amplifier 246 is applied through a resistor 254 to the base of a transistor 256 and through a resistor 258 to the base of a transistor 260. The collector of transistor 256 is connected through a resistor 257 to resistor 165. The emitters of the transistors 256 and 260 are connected via a lead 262 to the emitter of the heading mode transistor 196.

Approach mode command signals are fed via a resistor 264 to the base of a transistor 266, the output of which is applied through a diode 268 to a terminal of a field effect transistor 270. The radio signal is fed via capacitors 265 and resistor 267 to the transistor 270.

The course signal is fed to a terminal of the field effect transistor 270 via lead 272. The collector of transistor 266 is also applied through a resistor 272 through two parallel diodes 274 and 276 to a terminal of another field effect transistor 278 connected in series with the transistor 270. A resistor 273 connects the anode of diode 276 to the collector of transistor 266. A localizer switch signal is applied to a lead 280 connecting diodes 274 and 276 to the transistor 278.

Referring to FIG. 4, an amplifier 300 receives signals and feeds an output via resistor 302 which is applied to the bases of complementary transistors 304 and 306. The emitters of transistors 306 and 304 are connected to the bases of a second pair of complementary transistors 308 and 310. The emitters of transistors 308 and 310 are tied via resistors 312 to the input of the amplifier 300. The collector of transistor 304 is applied via lead 314 to the collector of the transistor 316.

Transistor 316 is connected through a resistor 318 to a complementary transistor 320. The emitters of transistors 316 and 320 are respectively coupled to the bases of complementary transistors 322 and 324. The inverting input of amplifier 300 is applied through resistor 330 to ground, and the inverting input of an operational amplifier 334 is also applied to ground through a resistor 335. The output of amplifier 334 is applied through a resistor 336 to a common connection with the bases of transistors 316 and 320. The emitters of transistors 322 and 324 are tied via a lead 338 to a common connection with emitters of complementary transistors 340 and 342. The bases of transistors 340 and 342 are commonly connected, with a resistor 344 tied between the emitters and the bases of the transistors. A variable bias is applied to the bases of the transistors via a resistor 343.

Transistors 340 and 342 and their associated circuitry constitute a novel nonlinear circuit for use with the present invention in a manner to be subsequently described. Diodes 348 and 350 are connected in series across the collectors of the transistors 340 and 342. The output from the nonlinear network is fed via the resistors 352 and 354 to the noninverting input of the amplifier 334. Resistors 356 and 358 may be selectively connected into the output of the nonlinear circuit by operation of a switch arm 360. Resistor 352 is coupled to ground by capacitor 359. The output of the amplifier 324 is fed via the resistor 336, and the resulting guidance signal to the roll motor is applied from the emitters of transistors 322 and 324 via a lead 364.

A left bank switch signal lead 366 is connected to the base of a transistor 368. The collector of transistor 368 is connected to the collector of a transistor 370, the base of which is connected to lead 372 on which appears the left bank switch signal. A right bank limit signal is applied via lead 374 through a resistor 376 to the base of transistor 368. A left bank limit signal is applied through lead 378 and through a resistor 380 to the base of transistor 370. Transistors 368 and 370 make up the bank limiter circuit of the invention.

A roll command signal is fed via lead 382 to a roll rate circuit comprising a transistor 384 having its collector connected in series with a diode 386, and a transistor 388 having its collector tied in series to a diode 390. A resistor 392 is connected in series with a capacitor 394 and a diode 396 across the circuit. The cathode of the diode 396 is tied across the base and the emitter of transistor 384. Similarly, a diode 398 is connected in series with a capacitor 400 and a resistor 402. The diode 398 is tied across the base and the emitter of the transistor 388.

A 5Hz signal is fed via lead 408 to a diode bridge 410 which comprises four semiconductor diodes connected in a bridge configuration. A 5Hz reference signal is also fed to the bridge 410. The output of the bridge is fed via a resistor 412 to the base of the transistor 414. A roll signal is fed via lead 416 through a capacitor 418 and a resistor 420 connected to the emitter of the transistor 414. The emitter of the transistor 414 is also connected through a resistance 422 and 424 to the input of an amplifier 426. A roll trim signal is fed through resistor 427 to amplifier 426. The output of the amplifier 426 is fed via a lead 428 to a point 430 tied to three parallel resistors 432, 434 and 436. The output of amplifier 426 is connected to a resistor 429 also connected to the amplifier input. Capacitors 433 are connected in series with resistor 432. The output of the resistor 436 is tied via lead 438 to an input of the amplifier 300. The outputs of the resistors 432 and 434 are fed via a lead 440 to the input of the amplifier 334. The outputs of the resistors 432–436 are connected through resistors 442 and 444 through a lead 446 to the roll command signal lead 382.

HEADING MODE OPERATION

The operation of the present invention will first be described when the system is set in the Heading Mode. In this mode, no radio signals are utilized, but only a heading signal which is supplied from a conventional heading bug system. This heading signal is fed through resistors 100 and 102 through the transistor 104. The field effect transistor switch 104 is operated by the transistor 196 which is energized by the Heading Mode signal fed via the resistor 194. In the Heading Mode, the transistor acts as a closed switch and allows heading signals to be fed to the input of the amplifier 112. The sensitivity of the heading signal is set by resistor 102. Resistor 100 and capacitor 106 comprise a decoupling circuit that works to suppress noise spikes.

The amplified signal from the amplifier 112 is fed into the amplifier 116 which is a unit gain amplifier. Relay switch arm 120 is controlled by the relay coil 121 in order to switch the signal into either the inverting or noninverting input of the amplifier. In the Heading Mode, the switch arm 120 is opened in order to feed the signal into the noninverting input of the amplifier through resistor 114. The output voltage provided by the amplifier 116 is of the same amplitude and same polarity of the input signal. The output of the amplifier 116 is fed through a resistor 117 which acts as a sag element for the roll delimiter shown in FIG. 4.

The roll command signal is fed from the resistor 117 to the lead 382 (FIG. 4). The signal is fed via resistor 376 to the bank limiting circuit comprising transistors 368 and 370. These two transistors are normally biased off, with the biases adjustable from potentiometers, not shown, so that the maximum bank capability of the aircraft may be controlled. This circuit provides a nominal adjustment of about 20° of bank, and may be adjustable from 15° to 25°. The transistor 368 clamps the voltage level from the signal amplifiers to a point where the right bank is limited. Transistor 370 is operable to limit the left bank. A reverse bias is placed upon the bases of the transistors, with the roll command signals fed through the emitters thereof. When the roll command signal exceeds the bias, the particular transistor is turned on and the signal voltage is limited at that point. From the bank limiting network, the limited signal is fed into a roll rate network made up of two parallel integrators comprising transistors 384 and 388 with capacity feedback. Diodes 386 and 390, in combination with the emitter base turn on potential of the transistors 384 and 388, provide an area of slightly less than one volt around a null where there is no delay in the input signals applied. Thus, fast control action is provided for a small bank signal. If the bank command signal is off null and greater than slightly less than one volt, one of transistors 384 or 388 will conduct depending upon the polarity of the signal. The conduction of one of these transistors will allow the signal to increase at a much slower rate than normal, thereby keeping the aircraft from going into a bank uncomfortably fast if the aircraft happens to be a fast responding airframe. It should be noted that although the voltage is allowed to rise very slowly in this circuit, the voltage may go back to zero very fast, so that the aircraft is allowed to roll out of the bank for good control action.

An attitude signal is fed from an attitude gyro, not shown, and is fed via lead 416 to the synchronous chopper detector circuit comprising transistor 414 and diode bridge circuit 410. The 5Hz signals applied to the bridge at 410 control the operation of the synchronous chopper detector. The chopped signal is amplified by the amplifier 426, the gain of the amplifier being set by resistors 427 and 429. The amplified signal from the amplifier 426 is fed through a resistor 434 to a resistor 442, wherein the attitude signal is mixed with the autopilot signal fed via lead 446. The attitude signal fed to the resistor 442 is proportional to the rate of change through resistor 432 and capacitors 433.

After the heading signal and the attitude signal have been mixed, they are fed to the input of amplifier 334 which serves as the preamplifier for the servo amplifier. This amplifier is operated at a very high open loop gain and drives the servo amplifier comprising complementary pair transistors 316, 320, 322 and 324. The output from these transistors is fed to drive the roll motor of the aircraft.

An important aspect of the invention is the nonlinear circuit comprising diodes 348 and 350 and transistors 340 and 342. If the output of the servo amplifier increases very slowly to the starting voltage of the roll motor, the roll motor moves the control cables which moves the ailerons for control of the airplane. The preamplifier 334 is operated at a very high gain so that a small error signal will eventually be amplified to the point where it will cause the roll motor to run. However, if a larger error signal occurs, the nonlinear network causes the motor not to run immediately at full speed. Thus, as soon as the roll motor starts, an output is provided from the nonlinear network and is provided to the input of the preamplifier 334 in order to reduce the gain of the amplifier.

Thus, the output from the servo amplifier is fed via lead 338 to the emitters of the transistors 340 and 342. The conduction point of the transistors 322 and 324 may be adjusted to the starting voltage of any specific roll motor by the variance of the roll threshold signal applied via resistor 343. This variance of the bias signal is accomplished with the use of a potentiometer, not shown. As the starting potential of servo motors vary slightly from aircraft to aircraft, the present invention thus enables very accurate nonlinear control of the roll motors which has not heretofore been available.

The diodes 348 and 350 act as isolation circuits to keep the desired voltages from being fed to the collectors of the transistors and causing leakage through the transistors. The output of the nonlinear circuit is fed through resistor 352 to the input of the preamplifier 334. If desired, the switch 360 may be utilized to switch resistors 356 or 358 into the output of the nonlinear circuit. The resistors are connected through capacitors 359 to ground in order to cause a delay in the feedback so that a small error signal will cause the roll motor to run full speed until the aircraft has assumed its proper attitude. Then the capacitors 359 will charge to reduce the speed of the roll motor.

MODE OPERATION

When it is desired to operate the present circuit in the Radio Mode, the heading mode signal is eliminated and the field effect transistor switch 104 is thus opened. The signal from the heading bug is then not allowed to flow into the amplifier 112. The field effect switch 136 is closed in the Radio Mode, thereby allowing radio course and rate signals to be fed into the input of the amplifier 112 via resistors 132 and 134. Resistor 130 and capacitor 131 comprise a noise decoupling network for the radio signals. Resistors 132 and 134 and capacitors 140 and 142 comprise a RC delay network which causes a small amount of delay in the left/right radio signal. This delay network also assists in removing noise from a noisy radio signal.

The course signal is fed from an omni radio course pickup, not shown, and is fed through resistors 152 and capacitor 153 which comprises a noise decoupling network. Resistor 154 sets the gain for the course signal. The relay arm 156 is controlled by the energization of the solenoid coil 174 and is closed during intercept operation of the aircraft. When the relay arm 156 is closed, a steady state course signal will be fed through to mix with the left/right radio signal at the mixing point 138.

Also during intercept, the left/right radio signal is fed to the noninverting input of amplifier 148 which is operated with an open loop gain. Just a few millivolts of offcenter radio signals fed into the input of the amplifier 148 will cause this amplifier to completely saturate. Amplifier 148 thus serves as the high gain amplifier 54 disclosed in FIG. 2 which provides the false radio signal during intercept of the aircraft. The output of the amplifier 148 is the same polarity of the radio signal error, however, the output of the amplifier 148 is a full 12 volt signal instead of the few millivolt input signal. The output of the amplifier 148 will remain at a full 12 volts as long as there is an error input.

Normally, the aircraft begins intercept with a full scale radio deflection error which would be many times the voltage required to cause saturation of the amplifier 148. The output of this amplifier 148 is fed through resistor 149 and through the transistor 150 which acts as a closed switch at all times during intercept. The current fed from amplifier 148 through resistor 149 is sufficient to cause approximately 22½° heading variation which is applied through the field effect transistor 150 to the mixing point 138. The current through resistors 132 and 134 at the initiation of intercept provide an additional 25° of heading deviation. The combination of signals from resistors 132 and 134 and resistor 149 is thus sufficient to cause an initial total heading deviation of approximately 45°.

Upon initiation of intercept, in the manner shown in FIG. 1, the aircraft 16 begins its intercept at an intercept angle of 45°. As the radio becomes off full scale peg, or as the radio signal error decreases as the aircraft approaches the radio course, the voltage fed to resistor 132 and 134 decreases proportional to the movement of the aircraft toward the radio source Thus, the heading deviation of the aircraft fed to the amplifier 112 will begin decreasing proportionally down to 22½° plus the radio heading provided by the amplifier 148.

As the aircraft crosses the center of the radio course, the output of the amplifier 148 will come quickly off saturation, go through zero and saturate in the opposite direction. This output of the amplifier 148 is fed through a resistor 158 to an absolute value detector made up of transistor 160 and its associated circuitry. When the amplifier 148 is saturated, the voltage on the collector of the transistor 160 will be zero or slightly negative. However, during the transition when the output of the amplifier 148 goes from one polarity to another during intercept with the radio course center, a positive voltage appears on the collector of the transistor 160.

This positive voltage is coupled to the base of one side of a flip-flop circuit made up of transistors 162 and 164. Transistor 162 is normally off during intercept of the aircraft. When the collector of the transistor 160 goes positive, transistor 162 turns on and due to the regenerative feedback, the transistor 164 turns off. After transistor 162 turns on, the collector of the transistor 164 goes to a high positive voltage and this voltage is fed to the gate of the field switch 150 to thereby close the transistor switch. This turning off of the transistor 150 removes the output from the amplifier 148 from the input of the amplifier 112. Thus, the false radio minimum intercept signal 22½° is removed.

At the same time that transistor 150 is biased off, the voltage on the collector of transistor 162 has been maintaining field effect transistor 146 in an off condition. However, at intercept of the center of the radio beam, the collector of the transistor 162 goes to approximately zero volt and thus transistor 146 is turned on. The input to transistor 146 is a high resistance 144 which is connected directly to the left/right radio signal. Thus, after the removal of the 22½° intercept signal, an equivalent signal is fed to the summing point from the left/right radio signal through the transistor 146. While a delay has heretofore been provided to the radio signal due to resistors 132 and 134 and capacitors 140 and 142, the network comprising resistor 144 and transistor 146 is now connected in parallel to provide an undelayed signal. Thus, an instantaneous effect is provided by the signal fed through resistor 144 and transistor 146, while a slightly delayed signal is fed through the network comprising resistors 132 and 134 and capacitors 140 and 142.

As previously noted, just prior to intercept with the center of the radio beam, transistor 162 was biased off and the collector voltage thereof was a relatively high positive voltage. This positive voltage was being felt through a resistor 171 to the base of the transistor 172. Transistor 172 was biased on to thereby energize the solenoid coil 174. Energization of the coil 174 maintained the solenoid switch arm 156 in the illustrated position to provide the steady state course signal for mixing with the radio signal. At intercept, the transistor 162 collector drops to zero to to thereby turn the transistor 172 off. Solenoid coil 174 is thus de-energized and the switch arm 156 is opened. This throws the high pass network 157 into the course signal input to provide a very small amount of steady state information to the circuit. Thus, at this time the aircraft may assume a crab angle necessary to fly in a cross wind if such is present during intercept.

As the aircraft approaches the center of the radio beam during intercept, the left/right radio signal decreases in amplitude to indicate that the aircraft is coming on course. This rate of change in the voltage is coupled through capacitor 265 and resistor 267. This rate of change causes the transistor 266 to be turned on which in turn biases the field effect transistor 270 on. The rate of change information is then coupled into the mixing point 138 through the transistor 270. It is mixed with the steady state radio and course signals.

When the aircraft is placed in an omni mode, the localizer switch line 280 will be provided with a high positive voltage. This high positive voltage is coupled through diodes 274 and 276 to the gate of the field effect transistor switch 278, opening the transistor gate 278. In the localizer mode, the voltage lead 280 will be zero and transistor 278 will be biased on and additional rate information will be coupled through transistor 265 and resistor 267. Thus, twice the gain of the normal rate of change on the left/right radio indication will be provided. Basically, transistor 270 acts as a closed switch in the approach mode. In the nave mode, transistor 278 acts as a closed switch during intercept and for ninety seconds after intercept to enable the aircraft to get on the radio course and stabilized in the nave mode. Then the transistor 270 will act as an open switch and take all the rate information out as the aircraft is in an omni nave mode. However, if the aircraft at that time is in a localizer nave mode, the aircraft will still be provided with half the normal rate of change coupled through the transistor 278.

As the aircraft intercepts with the center of the radio beam, the flip-flop circuit comprised of transistors 162 and 164 transitions, thereby causing the transistor 172 to turn off. The collector of transistor 172 goes positive and the positive voltage is fed through resistor 192 to the base of the transistor 190. Transistor 190 is thus turned on. Prior to the biasing on of the transistor 190, the collector of the transistor having had a high positive voltage. This high positive voltage was coupled through the diode 191 resistor 202 and capacitor 203 and to the gate of the field effect transistor switch 128. As the transistor 190 is biased on, and as collector goes to approximately zero voltage, the capacitor 203 is charged to the high positive voltage. Capacitor 203 then begins the discharge through the resistor 202.

As capacitor 203 discharges from the high positive voltage to the firing voltage of the transistor 128, the transistor 128 turns on. When the transistor 128 turns on, an additional resistor 126 is thrown across the amplifier 112 to thereby cut the gain of the amplifier 112 in half. This reduction of the gain of amplifier 112 is done to soften the effect of the control of any error signals on the aircraft. Tight control is required for the aircraft during intercept, but it is desirable to soften this control by reducing the gain of the amplifier 112 once the aircraft is on course in order to make the aircraft ride more comfortable.

Additionally, at the point of intercept with the radio beam center, the transition of the flip-flop comprising the transistors 162 and 164 initiated a ninety second timer comprised of diode 180, capacitor 181, resistor 183 and resistor 185. When the flip-flop transition is initiated, the voltage on the collector of transistor 184 began at zero and increased very slowly toward a high positive voltage. The diode 206 is approximately a 6 volt Zener diode, so that when the voltage on the collector of the transistor 184 gets to approximately 6 volts, any voltage above 6 volts will be coupled through the diode 206. Approximately 90 seconds is required for the voltage on the collector of the transistor 184 to reach approximately 6 volts. After this 90 seconds, the output is fed through resistor 207 to the base of the transistor 208. Transistor 208 will be turned on and its collector will go to approximately zero voltage. When transistor 208 was turned off, the collector was in a high positive voltage which had been fed back to the transistor 266 to maintain the field effect transistor switch 270 in an on position. Thus, when this voltage from transistor 208 is removed, transistor 266 is turned on and its collector will have a high positive voltage. The field effect transistor 270 will thus be turned off and any rate information in the nave mode will be removed.

When the collector of the transistor 208 is at approximately zero voltage, the base of transistor 218 goes to a slightly negative voltage due to resistor 219 being tied to the negative voltage supply. Transistor 218 is thus turned on. The output from the 90 second delay timer circuit is fed to resistor 207 and is also fed to resistor 223 to cause transistor 224 to be turned on. The collectors of transistors 218 and 224 are connected through leads 222 and 228 to the leads 374 and 378 on FIG. 4, in order to limit the bank angle of the aircraft. This bank limiting is caused by reducing the voltage on the bases of transistors 368 and 370 in FIG. 4 to limit the transistors in a lower level. The maximum signal felt on the emitters of the transistors 368 and 370 will allow only approximately a 7° bank, as compared to the previous 20° bank allowed.

The remainder of the operation of the circuitry in the radio mode approximates the operation of the circuitry while in the Heading Mode for control of the aircraft.

REVERSE MODE OPERATION

The operation of the aircraft when in a reverse mode operation is basically identical to the approach mode up through the output of the amplifier 112 in FIG. 3. In the reverse mode, a high positive voltage is fed via lead 119 to the solenoid coil 121 for energization thereof. The relay switch arm 120 will then switch the output of the amplifier 112 to the inverting input of the amplifier 116. If the aircraft is under a localizer radio beam, and the aircraft is flying on the back course thereof, the radio signals are reversed and in order to normally fly the aircraft, the output of the amplifier 112 must be fed through the inverting input of the amplifier 116. Thus, only the polarity of the guidance signals fed through the resistor 117 are changed.

In the omni tracking mode, after the aircraft has gone through the radio intercept, the flip-flop transistors 162 and 164 have transitioned, and the solenoid 174 has been opened to take the steady state radio course signal out of the circuit, it may be desired to change the radial of the omni which is being flown. If a large change is made, it is necessary to reset the circuit back into the intercept configuration in order to get the steady state course information and also to obtain the desirable dynamics for intercepting a new radial. As you turn the omni bearing selector knob of the aircraft, the rate of change and the voltage of the course pickoff is coupled through resistors 240 and capacitors 242 and 244. If this rate of change is approximately 9° per second or greater, the signal is coupled into amplifier 246 and the output from this amplifier is sufficient to cause an output from the absolute value detector transistor 260 and its associated circuitry. The output from this detector will be coupled into transistor 256 to turn transistor 256 off. The collector of transistor 256 will then become positive and this positive voltage will be coupled through resistor 257 to the base of transistor 164. Thus, the flip-flop circuits 162 and 164 are reset back to the original intercept configuration. The timing sequence previously described will then begin all over when the aircraft intercepts the new omni radial which has been selected.

Additionally, if for some reason the aircraft should be disposed in as much as a 45° heading deviation from the omni radio which has been selected, and the aircraft is in a very slow rate of change less than 90° per second, the rate circuit comprising resistor 240, capacitor 242 and the associated circuitry does not cause sufficient output from the amplifier 246 to reset the circuit intercept. Thus, when the aircraft is in a 45° slow change situation, the steady state voltage from the course pickoff and the aircraft will be coupled through resistor 248 and Zener diodes 250 and 252 to the input of the amplifier 246. The steady state signal will then cause an output from transistors 260 and 256 in order to reset the circuit.

Whereas the present invention has been described with respect to specific embodiments thereof, it will be understood that various changes and modifications will be suggested by one skilled in the art, and it is intended to encompass those changes and modifications as fall within the scope of the appended claims.

I claim:

1. A lateral guidance system for an aircraft comprising:
   a. amplifying means for amplifying a combined directional radio and course signal,
   b. means operable for directing the aircraft toward a directional radio beam at a selected intercept angle,
   c. means for introducing cross wind correction to the aircraft in response to intercept with said radio beam,
   d. means for reducing the gain of said amplifying means after a first preselected time interval from the intercept with said radio beam, and
   e. means for limiting the permissible bank angle of the aircraft after a second preselected time interval from the intercept with said radio beam.

2. The guidance system of claim 1 and further comprising:
   means for proportionally reducing said selected intercept angle to a residual level in response to approach of the aircraft toward said radio beam.

3. The guidance system of claim 1 wherein said means for introducing cross wind correction comprises:
   a high pass heading network.

4. The guidance system of claim 1 wherein said selected intercept angle is approximately 45°.

5. The guidance system of claim 4 wherein said selected intercept is reduced to approximately 22° as the aircraft approaches said radio beam.

6. The guidance system of claim 1 wherein said first time interval is approximately 20 seconds.

7. The guidance system of claim 1 wherein said second time interval is approximately 90 seconds.

8. An aircraft lateral guidance system comprising:
   a. summing means for summing a first signal representative of the detection of a directional radio beam with a second signal containing course information,
   b. amplifier means for amplifying the output of said summing means,
   c. means responsive to the output of said amplifier means for controlling the guidance of the aircraft toward an intercept with said radio beam,
   d. means responsive to said first signal for decreasing the angle of intercept down to a preset minimum intercept angle as the aircraft approaches said radio beam, and
   e. means responsive to intercept with said radio beam for reducing said minimum intercept angle and for directing the aircraft along said radio beam.

9. The system of claim 8 wherein said preset minimum intercept angle is determined by a high gain saturable amplifier.

10. The system of claim 9 wherein said means responsive to intercept comprises:
    an absolute value network connected to the output of said high gain amplifier, and
    switch means connected to said network for disconnecting said high gain amplifier from said system.

11. The system of claim 8 and further comprising:
    means for introducing high pass filtering into said second signal in response to intercept of the aircraft with the radio beam.

12. The system of claim 8 and further comprising:
    means for reducing the gain of said amplifier means after a predetermined time interval from the intercept with the radio beam.

13. The system of claim 8 and further comprising:
    means for limiting the permissible bank angle of the aircraft after a preselected time interval from the intercept with the radio beam.

14. The method of lateral guidance for an aircraft with respect to a directional radio beam comprising:
    a. combining directional radio and course signals into a lateral guidance control signal,
    b. introducing an intercept angle signal into said guidance control signal to maintain at least a selected minimum intercept angle of the aircraft during approach to the radio beam,
    c. reducing the angle of intercept of the aircraft down to said selected minimum intercept angle as the aircraft approaches the radio beam, and
    d. removing said intercept angle signal upon intercept with the radio beam.

15. The method of lateral guidance in claim 14 and further comprising:
    introducing cross wind correction to the aircraft in response to intercept with the radio beam.

16. The method of claim 14 and further comprising:
    reducing the amplitude of said guidance control signal after a predetermined time interval from intercept with the radio beam.

17. The method of claim 14 and further comprising:
    limiting the permissible bank angle of the aircraft after a predetermined time interval from intercept with the radio beam.

18. A method of lateral guidance for an aircraft comprising:
    a. amplifying a combined directional and course signal,
    b. directing the aircraft toward a directional radio beam at a selected intercept angle,
    c. introducing cross wind correction to the aircraft in response to intercept with said radio beam,
    d. reducing the gain of said amplifying means after a first preselected time interval from the intercept with said radio beam, and
    e. limiting the permissible bank angle of the aircraft after a second preselected time interval from the intercept with said radio beam.

19. The guidance system of claim 2 and further comprising:
    switching means for abruptly removing said residual level when the aircraft reaches the proximity of the course center line.

* * * * *